United States Patent
Morikuni et al.

(10) Patent No.: US 11,815,669 B2
(45) Date of Patent: Nov. 14, 2023

(54) LENS, OPTICAL SYSTEM, PROJECTOR, AND IMAGING DEVICE

(71) Applicant: SEIKO EPSON CORPORATION, Tokyo (JP)

(72) Inventors: Eiji Morikuni, Matsumoto (JP); Takuro Fushimi, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 47 days.

(21) Appl. No.: 17/462,405

(22) Filed: Aug. 31, 2021

(65) Prior Publication Data

US 2022/0066178 A1    Mar. 3, 2022

(30) Foreign Application Priority Data

Aug. 31, 2020 (JP) ................................ 2020-145440

(51) Int. Cl.
*G02B 13/16* (2006.01)
*G02B 3/08* (2006.01)
*G03B 21/28* (2006.01)

(52) U.S. Cl.
CPC .............. *G02B 13/16* (2013.01); *G02B 3/08* (2013.01); *G03B 21/28* (2013.01)

(58) Field of Classification Search
CPC .......... G02B 13/16; G02B 3/08; G02B 7/022; G02B 17/086; G02B 2003/0093; G03B 21/28

See application file for complete search history.

(56) References Cited

U.S. PATENT DOCUMENTS

| | | | |
|---|---|---|---|
| 7,048,388 | B2 | 5/2006 | Takaura et al. |
| 7,549,755 | B2 | 6/2009 | Sazuki |
| 2004/0156117 | A1 | 8/2004 | Takaura et al. |
| 2006/0193036 | A1 | 8/2006 | Suzuki |
| 2019/0011684 | A1 | 1/2019 | Ishihara et al. |
| 2020/0041871 | A1* | 2/2020 | Wan ................. G02B 7/022 |
| 2021/0033829 | A1 | 2/2021 | Ishigame |

FOREIGN PATENT DOCUMENTS

| JP | 2004-246042 | 9/2004 |
|---|---|---|
| JP | 2006-235516 | 9/2006 |
| JP | 2007-316674 | 12/2007 |

(Continued)

*Primary Examiner* — James C. Jones
(74) *Attorney, Agent, or Firm* — Dority & Manning, P.A.

(57) ABSTRACT

A lens includes a first surface, a second surface opposed to the first surface, a first outer circumferential part disposed at an outer circumferential side of the first surface, a second outer circumferential part disposed at an outer circumferential side of the second surface, three or more first reference parts provided to the first outer circumferential part, three or more second reference parts provided to the second outer circumferential part, and a first reference surface disposed at an outer circumferential side of the first outer circumferential part and the second outer circumferential part. The first surface and the second surface have a common design axis. A first imaginary plane including the first reference parts and a second imaginary plane including the second reference parts are perpendicular to the design axis respectively. The first reference surface extends in parallel to the design axis.

17 Claims, 13 Drawing Sheets

(56) References Cited

FOREIGN PATENT DOCUMENTS

| | | |
|---|---|---|
| JP | 2008-207478 | 9/2008 |
| JP | 2009-122572 | 6/2009 |
| JP | 2014-160111 | 9/2014 |
| JP | 2017-156712 | 9/2017 |
| JP | 2017-156713 | 9/2017 |
| JP | 2017-156714 | 9/2017 |
| JP | 2019-133061 | 8/2019 |
| JP | 2020-042103 | 3/2020 |
| JP | 2020-194115 | 12/2020 |

\* cited by examiner

LENS, OPTICAL SYSTEM, PROJECTOR, AND IMAGING DEVICE

The present application is based on, and claims priority from JP Application Serial Number 2020-145440, filed Aug. 31, 2020, the disclosure of which is hereby incorporated by reference herein in its entirety.

BACKGROUND

1. Technical Field

The present disclosure relates to a lens, an optical system, a projector, and an imaging device.

2. Related Art

A shape measurement method of an optical element for measuring a three-dimensional shape by performing scanning along a surface to be examined of the optical element with a probe of a three-dimensional measurement instrument is described in JP-A-2014-160111 (Document 1). In Document 1, the optical element as a measurement target is provided with an attachment reference surface for fixing the optical element, and a plurality of measurement reference marks disposed in an area outside a light path in the surface to be examined. The attachment reference surface extends in a thickness direction of the optical element crossing the surface to be examined. When measuring the surface shape, the attachment reference surface is gripped by a measuring jig. Thus, the optical element is set to a predetermined posture in which the surface to be examined is opposed to the probe. In the measurement of the surface shape, the measurement reference marks are detected by the probe, and the positions of the measurement reference marks are set as reference coordinates.

In Document 1, there is not disclosed a technology of accurately detecting a tilt generated in a first surface and a tilt generated in a second surface when measuring the surface shape using each of the first surface and the second surface opposed to each other in the thickness direction of the optical element as the surface to be examined.

SUMMARY

A lens according to the present disclosure includes a first surface, a second surface opposed to the first surface, a first outer circumferential part disposed at an outer circumferential side of the first surface, a second outer circumferential part disposed at an outer circumferential side of the second surface, a plurality of, three or more, first reference parts provided to the first outer circumferential part, a plurality of, three or more, second reference parts provided to the second outer circumferential part, and a first reference surface disposed at an outer circumferential side of the first outer circumferential part and the second outer circumferential part. The first surface and the second surface have a common design axis. A first imaginary plane including the plurality of first reference parts and a second imaginary plane including the plurality of second reference parts are perpendicular to the design axis respectively. The first reference surface extends in parallel to the design axis.

DESCRIPTION OF AN EXEMPLARY EMBODIMENT

A lens and a shape measurement method of a lens according to the present disclosure will hereinafter be described with reference to the drawings. Further an optical system, a projector, and an imaging device having such a lens will be described.

Lens

Figure 1:
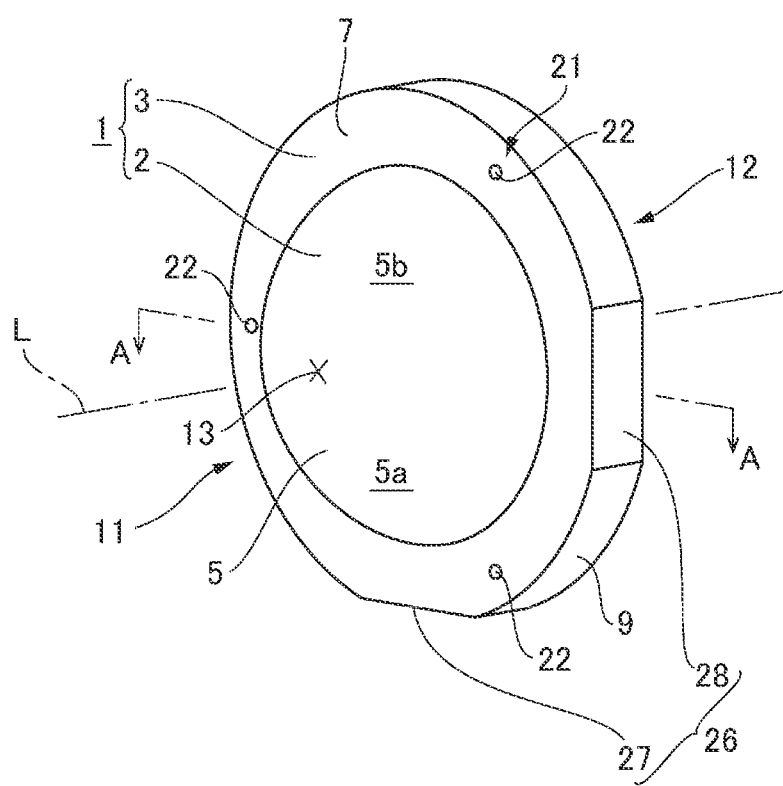
FIG. 1 is a perspective view of a lens according to the present disclosure when viewed from a side of a first surface.
Figure 2:
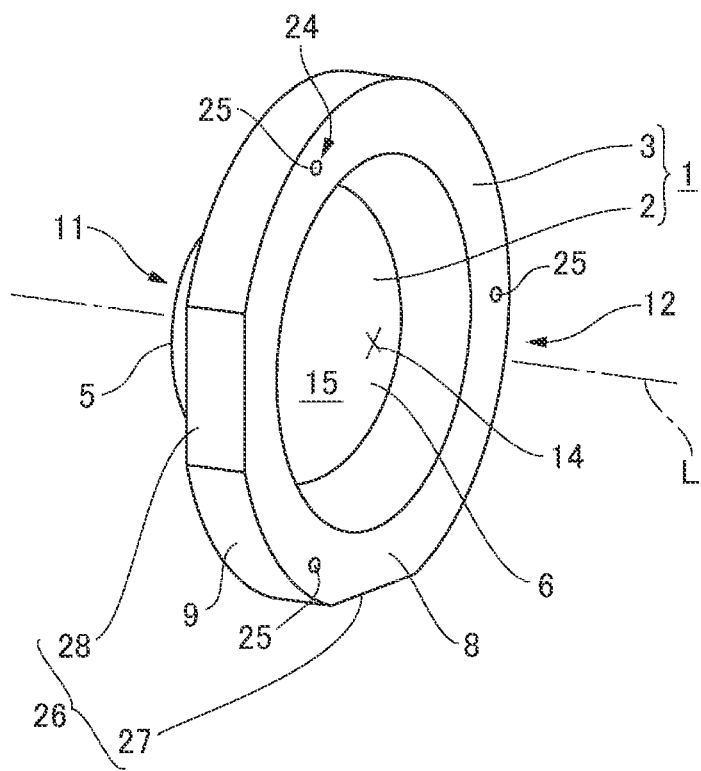
FIG. 2 is a perspective view of the lens shown in FIG. 1 when viewed from a side of a second surface.
Figure 3:
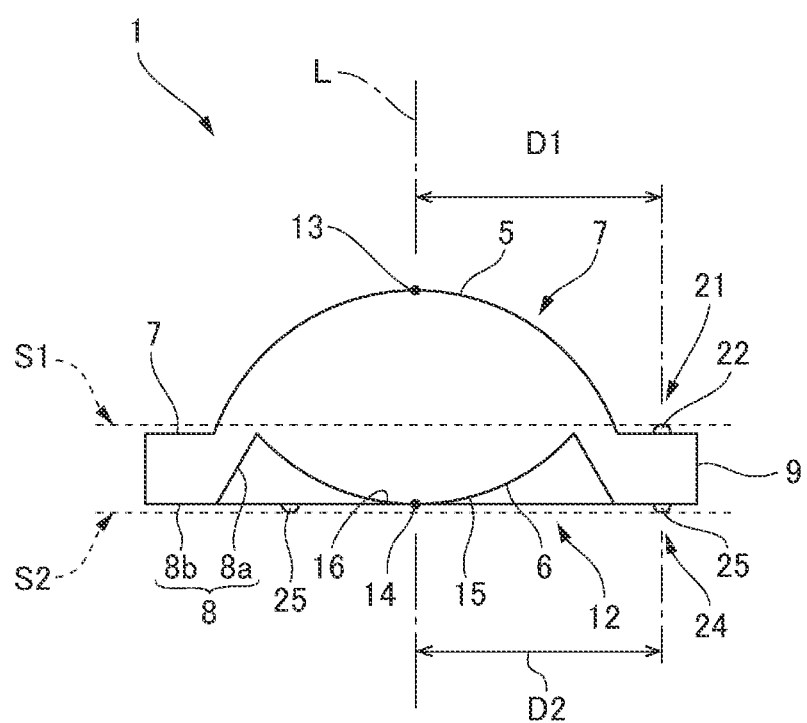
FIG. 3 is a cross-sectional view of the lens shown in FIG. 1 when being cut along a design axis.

FIG. 1 is a perspective view of a lens to which the present disclosure is applied when viewed from a side of an obverse surface. FIG. 2 is a perspective view of the lens shown in FIG. 1 when viewed from a side of a reverse surface. FIG. 3 is a cross-sectional view of the lens shown in FIG. 1 when being cut along a design axis.

The lens 1 according to the present example is made of resin. As shown in FIG. 1 and FIG. 2, the lens 1 is provided with a lens main body part 2, and a flange part 3 which has a ring-like shape, and is disposed at an outer circumferential side of the lens main body part 2. The flange part 3 surrounds the lens main body part 2. The lens main body part 2 is provided with a first surface 5 and a second surface 6 opposed to the first surface 5. The flange part 3 is provided with a first outer circumferential part 7 disposed at an outer circumferential side of the first surface 5, and a second outer circumferential part 8 disposed at an outer circumferential side of the second surface 6. Further, the flange part 3 is provided with an outer circumferential surface 9 which has a ring-like shape, and couples an outer circumferential end of the first outer circumferential part 7 and an outer circumferential end of the second outer circumferential part 8 to each other. The first surface 5 and the second surface 6 have a design axis L common to the both surfaces. In the present example, the design axis L is an optical axis of the lens 1.

As shown in FIG. 1, the first surface 5 and the first outer circumferential part 7 are provided to an obverse surface 11 of the lens 1. As shown in FIG. 2, the second surface 6 and the second outer circumferential part 8 are provided to a reverse surface 12 of the lens 1. It should be noted that the obverse surface 11 and the reverse surface 12 are defined for descriptive purposes, and it is also possible to define the second surface 6 side as the obverse surface 11 of the lens 1 and the first surface 5 side as the reverse surface 12 of the lens 1.

As shown in FIG. 3, the first surface 5 is provided with a convex shape. Further, the first surface 5 is provided with a first inflection point 13 on the design axis L. In the present example, the first surface 5 is provided with an aspheric shape. The second surface 6 is provided with a convex shape. Further, the second surface 6 is provided with a second inflection point 14 on the design axis L. In the present example, the second surface 6 is provided with an aspheric shape. The second surface 6 is provided with a reflective coating layer 15. The reflective coating layer 15 has a concave shape on which the surface shape of the second surface 6 is transferred. Therefore, the lens 1 is provided with a reflecting surface 16 having a concave shape in the second surface 6. It should be noted that the first surface 5 and the second surface 6 are not required to have an aspheric shape.

A light beam having entered the lens 1 from the first surface 5 is folded back by the reflecting surface 16, and proceeds toward the first surface 5. More specifically, the light beam passing through the lens 1 proceeds via a first area 5a of the first surface 5, the reflecting surface 16, and a second area 5b different from the first area 5a in the first surface 5 in this order. As shown in FIG. 1, the first area 5a of the first surface 5 is located at one side of the design axis L, and the second area 5b is located at the other side of the design axis L. Further, the reflecting surface 16 reflects the light beam having entered through the first area 5a at one side of the design axis L to make the light beam proceed toward the second area 5b located at the other side of the design axis L. In the first surface 5, the first area 5a and the second area 5b do not overlap each other.

The first outer circumferential part 7 is a plane having a ring-like shape spreading from the outer circumferential end of the first surface 5 toward the outer circumferential side. The first outer circumferential part 7 is provided with three first reference parts 21. Each of the first reference parts 21 is a first protrusion 22 which has a hemispherical shape and protrudes from the first outer circumferential part 7 in a direction along the design axis L. The three first reference parts 21 are separated at regular angular intervals around the design axis L. In other words, the tips of the first protrusions 22 are separated at angles of 120° around the design axis L. As shown in FIG. 3, a first distance D1 from the design axis L to the tip of each of the first protrusions 22 is substantially constant.

As shown in FIG. 3, the second outer circumferential part 8 is provided with a taper surface portion 8a which has a ring-like shape, and extends at an opposite side to the first surface 5 from the outer circumferential end of the second surface 6 toward the outer circumferential side, and a flat surface portion 8b which has a ring-like shape, and spreads from an outer circumferential end of the taper surface portion 8a toward the outer circumferential side. The flat surface portion 8b is provided with three second reference parts 24. Each of the second reference parts 24 is a second protrusion 25 which has a hemispherical shape and protrudes from the second outer circumferential part 8 in a direction along the design axis L. The three second reference parts 24 are separated at regular angular intervals around the design axis L. In other words, the tips of the second protrusions 25 are separated at angles of 120° around the design axis L. As shown in FIG. 3, a second distance D2 from the design axis L to the tip of each of the second protrusions 25 is substantially constant. Further, the first distance D1 from the design axis L to each of the first protrusions 22 and the second distance D2 from the design axis L to each of the second protrusions 25 are substantially the same.

As shown in FIG. 1 and FIG. 2, the outer circumferential surface 9 of the flange part 3 is provided with reference surfaces 26 extending in parallel to the design axis L. In the present example, as the reference surfaces 26, there are provided a first reference surface 27 and a second reference surface 28 at two places separate from each other in a circumferential direction of the outer circumferential surface 9 of the flange part 3. The first reference surface 27 and the second reference surface 28 are each parallel to the design axis L. The second reference surface 28 is perpendicular to the first reference surface 27.

Method of Manufacturing Lens

Figure 4:
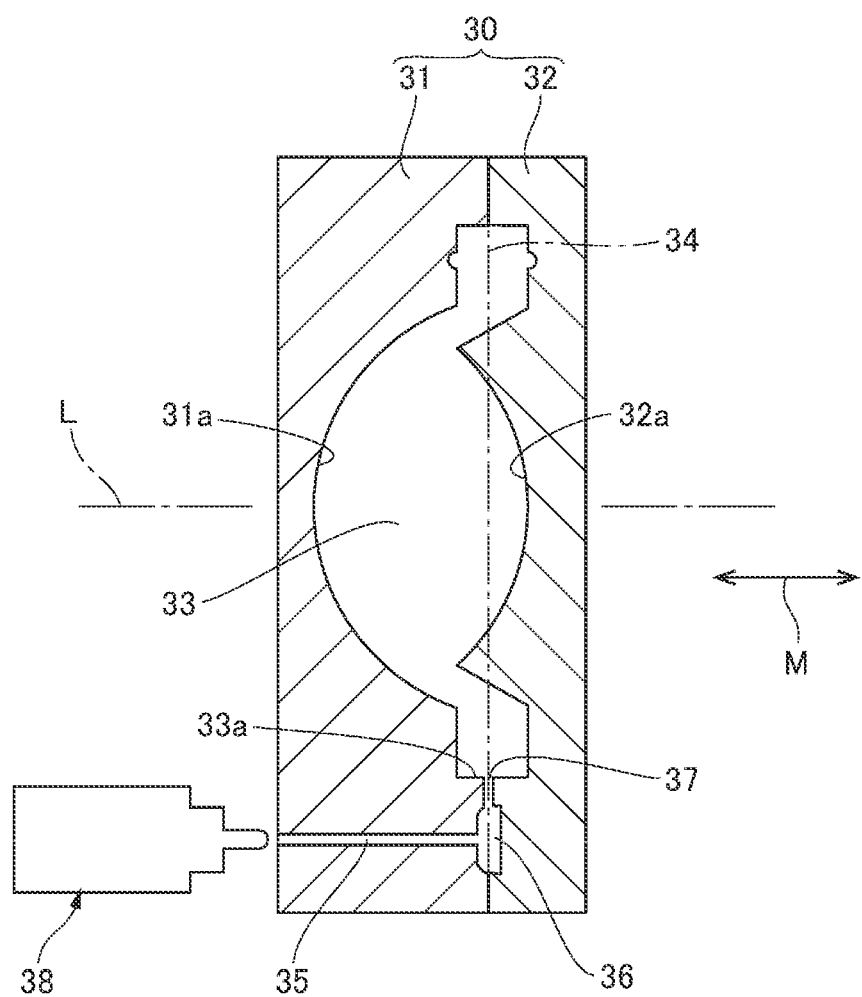
FIG. 4 is an explanatory diagram of a metal mold to be used in the manufacture of the lens.

FIG. 4 is an explanatory diagram of a metal mold to be used in the manufacture of the lens 1. The metal mold 30 is provided with a stationary side metal mold 31 and a movable side metal mold 32 which moves in a predetermined direction relatively to the stationary side metal mold 31. When the stationary side metal mold 31 and the movable side metal mold 32 are clamped, a cavity 33 corresponding to the shape of the lens 1 is formed between the stationary side metal mold 31 and the movable side metal mold 32. A surface 31a opposed to the movable side metal mold 32 in the stationary side metal mold 31 is provided with a transfer shape on which the obverse surface 11 of the lens 1 is transferred. A surface 32a opposed to the stationary side metal mold 32 in the movable side metal mold 32 is provided with a transfer shape on which the reverse surface 12 of the lens 1 is transferred. A parting line 34 between the stationary side metal mold 31 and the movable side metal mold 32 is perpendicular to a moving direction M of the movable side metal mold 32. The moving direction M of the movable side metal mold 32 is a direction along the design axis L of the lens 1 to be formed using the metal mold 30.

The stationary side metal mold 31 is provided with a sprue 35 at a circumferential side of the cavity 33. The sprue 35 extends in the moving direction M of the movable side metal mold 32. Further, the stationary side metal mold 31 is provided with a runner 36 extending from the sprue 35 to the cavity 33. The runner 36 is communicated with a circumferential wall surface 33a of the cavity 33. The circumferential wall surface 33a is a region for forming the outer circumferential surface 9 of the lens 1. Therefore, a gate 37 is disposed in the region for forming the outer circumferential surface 9 of the lens 1.

When forming the lens 1, the stationary side metal mold 31 and the movable side metal mold 32 are set to a state of being clamped. Subsequently, an injection molding machine 38 is coupled to the sprue 35, and then resin is injected from the injection molding machine 38. The resin from the injection molding machine 38 is injected into the cavity 33 from the sprue 35 via the runner 36 and the gate 37 to fill the cavity 33. Thus, the lens 1 on which the shape of the cavity 33 is transferred is formed inside the cavity 33.

According to such a manufacturing method, the parting line 34 of the metal mold 30 is disposed at a position not interfering with the obverse surface 11 and the reverse surface 12 of the lens 1. Further, the gate 37 is also disposed at a position not interfering with the obverse surface 11 and the reverse surface 12 of the lens 1. Therefore, it is possible to accurately mold the obverse surface 11 and the reverse surface 12 of the lens 1.

Shape Measurement Method for Lens

Figure 5:
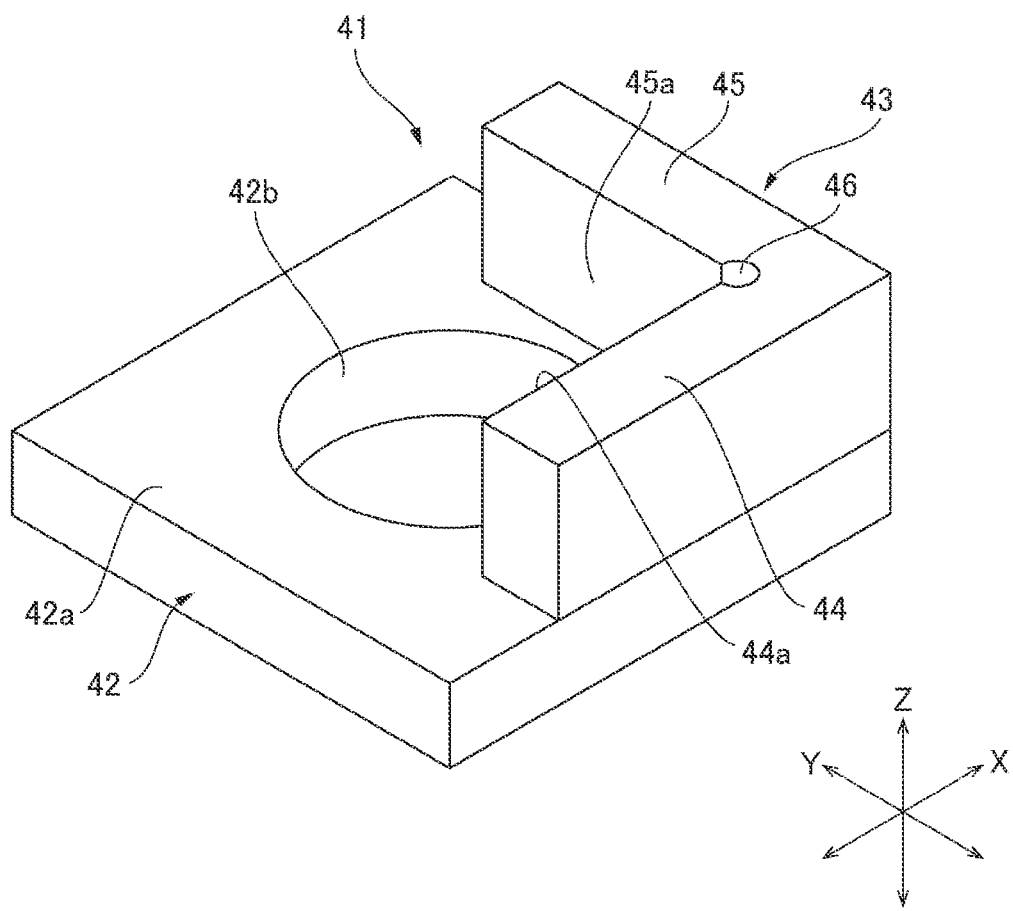
FIG. 5 is a schematic perspective view of a measurement jig for supporting the lens.
Figure 6:
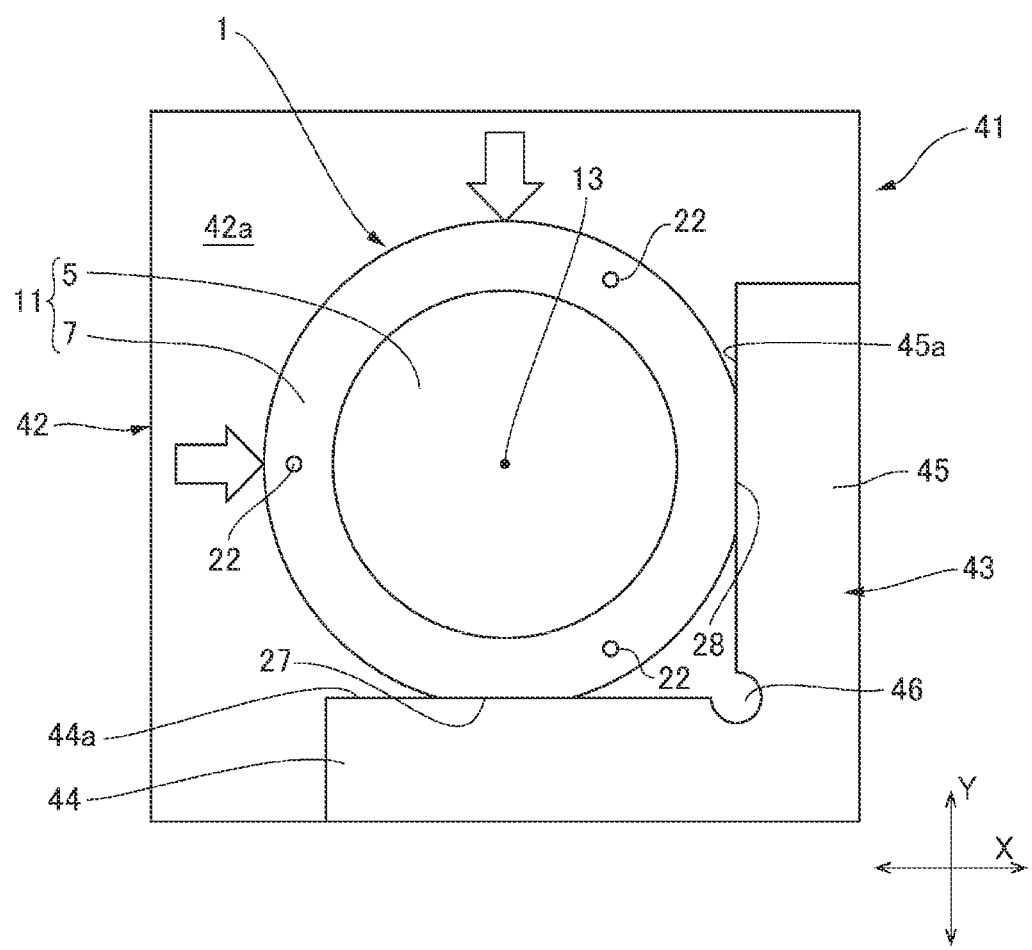
FIG. 6 is a schematic plan view of the lens and the measurement jig when measuring the first surface.
Figure 7:
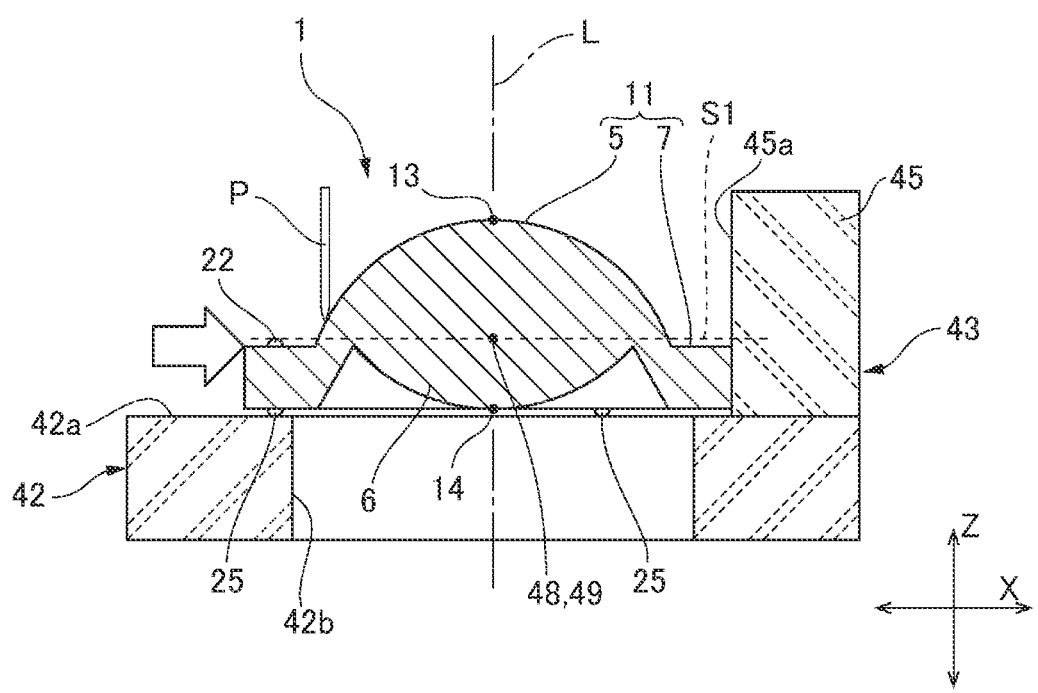
FIG. 7 is a schematic cross-sectional view of the lens and the measurement jig when measuring the first surface.
Figure 8:
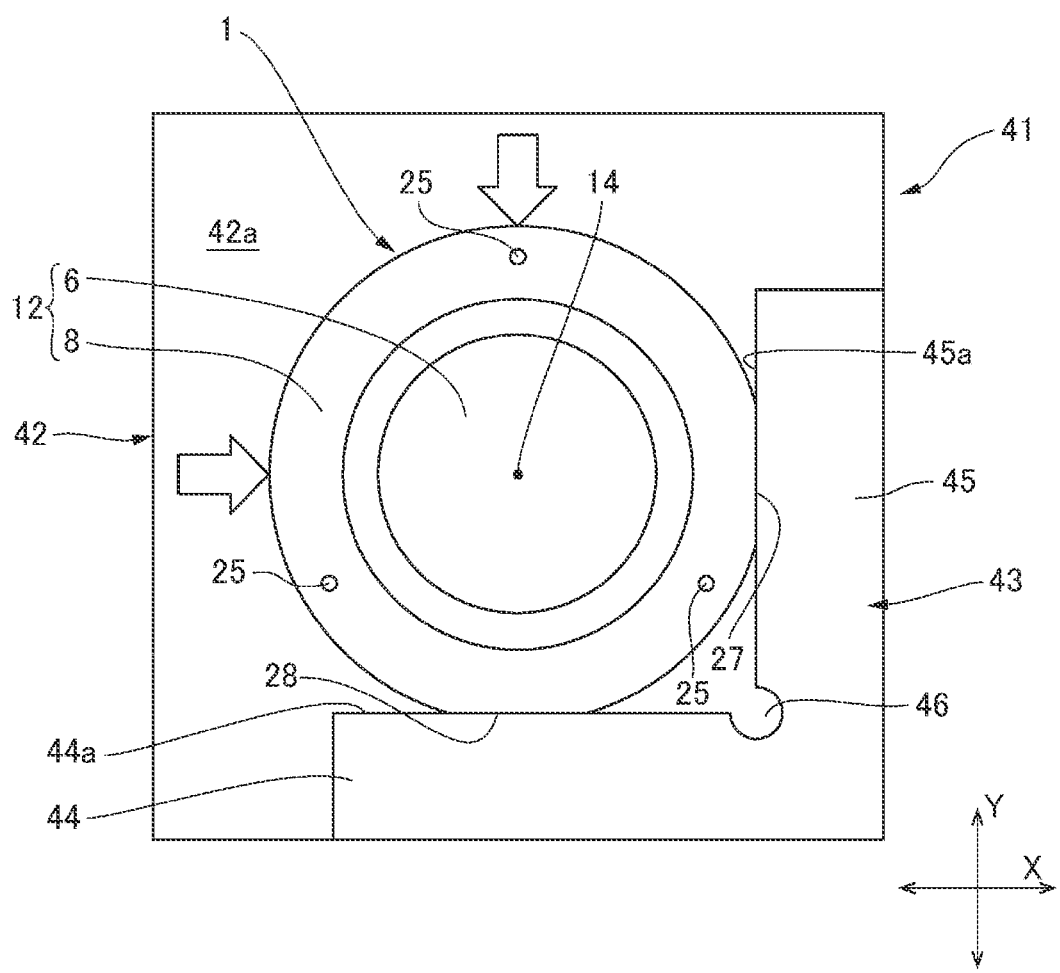
FIG. 8 is a schematic plan view of the lens and the measurement jig when measuring the second surface.
Figure 9:
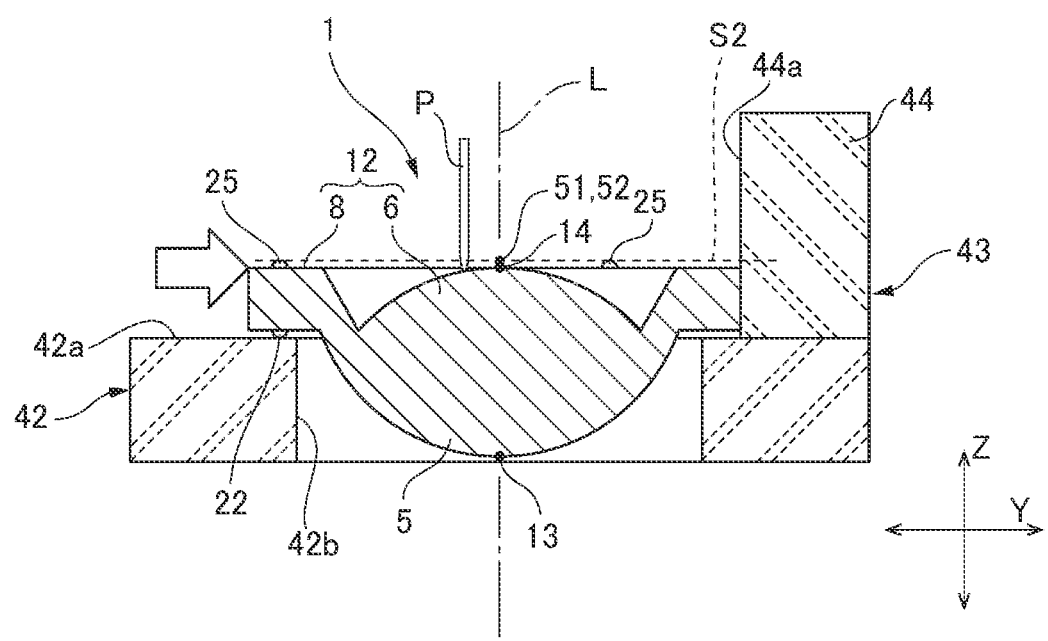
FIG. 9 is a schematic cross-sectional view of the lens and the measurement jig when measuring the second surface.

Then, a shape measurement method for the lens 1 will be described. FIG. 5 is a schematic perspective view of a measurement jig for supporting the lens 1. FIG. 6 is a schematic plan view of the lens 1 and the measurement jig when performing the shape measurement of the first surface 5 of the lens 1. FIG. 7 is a schematic cross-sectional view of the lens 1 and the measurement jig when performing the shape measurement of the first surface 5 of the lens 1. FIG. 8 is a schematic plan view of the lens 1 and the measurement jig when performing the shape measurement of the second surface 6 of the lens 1. FIG. 9 is a schematic cross-sectional view of the lens 1 and the measurement jig when performing the shape measurement of the second surface 6 of the lens 1. It should be noted that in the following example, the shape measurement of the lens 1 is performed in a state in which the reflective coating layer 15 has not been provided to the second surface 6 of the lens 1.

Measurement Jig

As shown in FIG. 5, the measurement jig 41 is provided with a stage 42 having a rectangular plate shape, and a reference member 43 fixed to a surface 42a of the stage 42. The stage 42 is provided with an opening part 42b having a circular shape at the center. In the following description, three axes perpendicular to each other are defined as an X axis, a Y axis, and a Z axis. The surface 42a of the stage 42 is an X-Y plane including the X axis and the Y axis. The Z axis corresponds to a vertical direction, and a height direction from the surface 42a of the stage 42.

The reference member 43 is provided with a first extending part 44 extending in the X-axis direction at one side in the Y-axis direction of the opening part 42b, and a second extending part 45 extending in the Y-axis direction at one side in the X-axis direction of the opening part 42b. On a surface at the opening part 42b side of the first extending part 44, there is disposed a jig-side first reference part 44a vertically extending in the Z-axis direction from the surface 42a of the stage 42. The jig-side first reference part 44a is an X-Z plane including the X axis and the Z axis. On a surface at the opening part 42b side of the second extending part 45, there is disposed a jig-side second reference part 45a vertically extending in the Z-axis direction from the surface 42a of the stage 42. The jig-side second reference part 45a is a Y-Z plane including the Y axis and the Z axis.

In an inside corner portion at a corner part where the first extending part 44 and the second extending part 45 cross each other, there is disposed a recessed part 46 having a circular shape. The X axis and the Y axis cross each other at the center of the recessed part 46. The center of the recessed part 46 forms an origin of a coordinate system for performing the shape measurement of the lens 1.

Procedure of Shape Measurement

When performing the shape measurement of the first surface 5 of the lens 1, the lens 1 is mounted on the stage 42 with the second surface 6 of the lens 1 facing downward as shown in FIG. 6 and FIG. 7. Further, the first reference surface 27 of the lens 1 is made to have contact with the jig-side first reference part 44a of the reference member 43, and the second reference surface 28 of the lens 1 is made to have contact with the jig-side second reference part 45a of the reference member 43. Then, the lens 1 is pressed against the jig-side first reference part 44a and the jig-side second reference part 45a with a biasing mechanism not shown. When viewing the state in which the lens 1 is pressed against the jig-side first reference part 44a and the jig-side second reference part 45a from the Z-axis direction, the first surface 5 and the second surface 6 are located inside the opening part 42b. Further, the first protrusions 22 of the first outer circumferential part 7 and the second reference parts 24 of the second outer circumferential part 8 are located outside the opening part 42b.

Here, when the lens 1 is provided with such an ideal shape as designed, the tips of the three second protrusions 25 of the lens 1 have contact with the surface 42a of the stage 42. Further, when the lens 1 is provided with such an ideal shape as designed, the three first protrusions 22 respectively overlap the three second protrusions 25 when viewed from the Z-axis direction.

Then, a probe P of a three-dimensional measurement instrument is made to have contact with the lens 1 from above in the Z-axis direction, and then, the obverse surface 11 of the lens 1 is scanned with the probe P in the X-axis direction and the Y-axis direction. The scanning range with the probe P includes the first surface 5 and the first outer circumferential part 7 of the lens 1.

In the shape measurement, first, the probe P is made to have contact with the first protrusions 22 to obtain the three-dimensional coordinates of the tips of the respective first protrusions 22. Further, as shown in FIG. 7, a first imaginary plane S1 including the tips of the respective first protrusions 22 is calculated from these three three-dimensional coordinates. Further, a tilt amount of the obverse surface 11 of the lens 1 is obtained based on positional relationships between the first imaginary plane S1, the first reference surface 27, and the second reference surface 28.

Subsequently, the first surface 5 is scanned with the probe P to obtain the three-dimensional coordinates of the surface shape of the first surface 5. Thus, the measurement of the surface shape of the first surface 5 is completed. Here, fitting is performed so that the difference between the measurement result of the first surface 5 and the surface shape of the design formula of the first surface 5 becomes the smallest, and a difference between the surface shape after the fitting and the surface shape of the design formula is calculated. The optical surface accuracy of the first surface 5 is evaluated based on the difference between the surface shape after the fitting and the surface shape of the design formula.

Further, a curved line connecting the three-dimensional coordinates of the surface shape of the first surface 5 is obtained, and then the curved line is differentiated to obtain a point at which the differential value becomes zero. Thus, a first inflection point 13 where the design axis L and the first surface 5 cross each other is obtained. Then, the coordinate of the first projection point 48 which is obtained by projecting the first inflection point 13 on the first imaginary plane S1 in the Z-axis direction is calculated. Further, the coordinate of a first central point 49 located at the center of the tips of the three first protrusions 22 on the first imaginary plane S1 is calculated. Then, a difference between the coordinate of the first projection point 48 and the coordinate of the first central point 49 is calculated. The difference between the coordinate of the first projection point 48 and the coordinate of the first central point 49 corresponds to an amount of eccentricity of the first surface 5.

Then, the shape measurement of the second surface 6 of the lens 1 is performed. The shape measurement of the second surface 6 can be performed in a similar manner to the shape measurement of the first surface 5. In other words, as shown in FIG. 8 and FIG. 9, the lens 1 is mounted on the stage 42 with the first surface 5 facing downward. Further, the first reference surface 27 of the lens 1 is made to have contact with the jig-side second reference part 45a of the reference member 43, and the second reference surface 28 of the lens 1 is made to have contact with the jig-side first reference part 44a of the reference member 43. Then, the lens 1 is pressed against the jig-side first reference part 44a and the jig-side second reference part 45a with a biasing mechanism not shown. Here, when the lens 1 is provided with such an ideal shape as designed, the tips of the three first protrusions 22 of the lens 1 have contact with the surface 42a of the stage 42. Further, when the lens 1 is provided with such an ideal shape as designed, the three first protrusions 22 respectively overlap the three second protrusions 25 when viewed from the Z-axis direction.

Then, a probe P of the three-dimensional measurement instrument is made to have contact with the lens 1 from above in the Z-axis direction, and then, the reverse surface 12 of the lens 1 is scanned with the probe P in the X-axis direction and the Y-axis direction. In the shape measurement, first, the probe P is made to have contact with the second protrusions 25 to obtain the three-dimensional coordinates of the tips of the respective second protrusions 25. Further, a second imaginary plane S2 including the tips of the respective second protrusions 25 is calculated from these three three-dimensional coordinates. Further, a tilt amount of the reverse surface 12 of the lens 1 is obtained based on positional relationships between the second imaginary plane S2, the first reference surface 27, and the second reference surface 28. Here, it is also possible to compare the first imaginary plane S1 and the second imaginary plane S2 with each other to obtain the relative tilt amount between the obverse surface 11 and the reverse surface 12 of the lens 1.

Subsequently, the second surface 6 is scanned with the probe P to obtain the three-dimensional coordinates of the surface shape of the second surface 6. Thus, the measurement of the surface shape of the second surface 6 is completed. Here, fitting is performed so that the difference between the measurement result of the second surface 6 and the surface shape of the design formula of the second surface 6 becomes the smallest, and a difference between the surface shape after the fitting and the surface shape of the design formula is calculated. The optical surface accuracy of the second surface 6 is evaluated here based on the difference between the surface shape after the fitting and the surface shape of the design formula.

Further, a curved line connecting the three-dimensional coordinates of the surface shape of the second surface 6 is obtained, and then the curved line is differentiated to obtain a point at which the differential value becomes zero. Thus, a second inflection point 14 where the design axis L and the second surface 6 cross each other is obtained. Then, the coordinate of the second projection point 51 which is obtained by projecting the second inflection point 14 on the second imaginary plane S2 in the Z-axis direction is calculated. Further, the coordinate of a second central point 52 located at the center of the tips of the three second protrusions 25 on the second imaginary plane S2 is calculated. Then, a difference between the coordinate of the second projection point 51 and the coordinate of the second central point 52 is calculated. The difference between the coordinate of the second projection point 51 and the coordinate of the second central point 52 corresponds to an amount of eccentricity of the second surface 6.

Ideal Lens

Here, when the lens 1 is an ideal lens provided with such an ideal shape as designed, the first reference surface 27 and the second reference surface 28 are parallel to the design axis L. Further, the first imaginary plane S1 is perpendicular to the first reference surface 27 and the second reference surface 28. In other words, in the ideal lens, the tilt amount of the obverse surface 11 of the lens 1 obtained based on the first imaginary plane S1 is zero. Therefore, the first imaginary plane S1 is perpendicular to the design axis L. Further, the second imaginary plane S2 is perpendicular to the first reference surface 27 and the second reference surface 28. In other words, in the ideal lens, the tilt amount of the reverse surface 12 of the lens 1 obtained based on the second imaginary plane S2 is zero. Therefore, the first imaginary plane S1 and the second imaginary plane S2 are parallel to each other. Therefore, the first imaginary plane S1 and the second imaginary plane S2 are perpendicular to the design axis L.

Further, the coordinate of the first projection point 48 obtained by projecting the first inflection point 13 of the first surface 5 on the first imaginary plane S1 and the coordinate of the first central point 49 located at the center of the tips of the three first reference parts 21 coincide with each other. In other words, in the ideal lens, an amount of eccentricity of the first surface 5 is zero. Similarly, the coordinate of the second projection point 51 obtained by projecting the second inflection point 14 of the second surface 6 on the second imaginary plane S2 and the coordinate of the second central point 52 located at the center of the tips of the three second reference parts 24 coincide with each other. In other words, in the ideal lens, an amount of eccentricity of the second surface 6 is zero.

Functions and Advantages

The lens 1 according to the present example has the first surface 5, the second surface 6 opposed to the first surface 5, the first outer circumferential part 7 disposed at the outer circumferential side of the first surface 5, and the second outer circumferential part 8 disposed at the outer circumferential side of the second surface 6. Further, the lens 1 has the three, namely the plurality of first reference parts 21 provided to the first outer circumferential part 7, the three, namely the plurality of second reference parts 24 provided to the second outer circumferential part 8, and the reference surfaces 26 disposed at the outer circumferential side of the first outer circumferential part 7 and the second outer circumferential part 8. The first surface 5 and the second surface 6 have a design axis L common to the both surfaces. When defining the first imaginary plane S1 including the plurality of first reference parts 21, and the second imaginary plane S2 including the plurality of second reference parts 24, the first imaginary plane S1 and the second imaginary plane S2 are perpendicular to the design axis L. The reference surfaces 26 extend in parallel to the design axis L.

According to the present example, the three first reference parts 21 provided to the lens 1 are disposed at the outer circumferential side of the first surface 5. Therefore, when molding the lens 1, the first reference parts 21 are formed with accuracy equivalent to that of the first surface 5. Similarly, the three second reference parts 24 provided to the lens 1 are disposed at the outer circumferential side of the second surface 6. Therefore, when molding the lens 1, the second reference parts 24 are formed with accuracy equivalent to that of the second surface 6. Further, the first reference surface 27 and the second reference surface 28 as the reference surfaces 26 are parallel to the design axis L of the lens 1. Therefore, the reference surfaces 26 can accurately be provided to the lens 1. Therefore, by measuring the obverse surface 11 of the lens 1 in the state of making the reference surfaces 26 have contact with the reference members 43 of the measurement jig 41 to define the first imaginary plane S1 including the plurality of first reference parts 21, it is possible to accurately obtain the tilt amount of the first surface 5 based on the positional relationship between the reference surfaces 26 and the first imaginary plane S1. Further, by measuring the reverse surface 12 of the lens 1 in the state of making the reference surfaces 26 have contact with the reference members 43 of the measurement jig 41 to define the second imaginary plane S2 including the plurality of second reference parts 24, it is possible to accurately obtain the tilt amount of the second surface 6 based on the positional relationship between the reference surfaces 26 and the second imaginary plane S2.

Here, when the tilt occurs in the first surface 5, the first imaginary plane S1 is tilted with respect to the reference surfaces 26. Further, when the tilt occurs in the second surface 6, the second imaginary plane S2 is tilted with respect to the reference surfaces 26. On the other hand, when no tilt occurs in the first surface 5 and the second surface 6, the first imaginary plane S1 and the second imaginary plane S2 become perpendicular to the reference surfaces 26. In other words, the first imaginary plane S1 and the second imaginary plane S2 become parallel to each other. Therefore, the first imaginary plane S1 and the second imaginary plane S2 are both perpendicular to the design axis L. Therefore, according to the lens 1 related to the present example, whether or not the tilt occurs in the first surface 5 and the second surface 6 can be detected with high accuracy.

It should be noted that the three first reference parts 21 are each disposed at the outer circumferential side of the first surface 5. Therefore, there is no chance for the three first reference parts 21 to interfere with the light beam passing through the first surface 5. Further, the three second reference parts 24 are each disposed at the outer circumferential side of the second surface 6. Therefore, there is no chance for the three second reference parts 24 to interfere with the light beam passing through the second surface 6.

Further, the reference surfaces 26 are parallel to the design axis L. Therefore, when performing the measurement of the surface shape using each of the first surface 5 and the second surface 6 as the surface to be examined, by making the reference surfaces 26 have contact with the reference members 43 of the measurement jig 41, it is possible to make the design axis L of the lens 1 face to a direction parallel to the back-and-forth direction of the probe P. Therefore, it is possible to accurately measure the surface shape of each of the first surface 5 and the second surface 6.

Here, in the lens 1 according to the present example, the reference surfaces 26 extend in parallel to the design axis L, and the first imaginary plane S1 and the second imaginary plane S2 are perpendicular to each other. Therefore, no tilt occurs in the first surface 5 and the second surface 6.

Then, in the present example, the plurality of first reference parts 21 are the first protrusions 22 provided to the first outer circumferential part 7. The first imaginary plane S1 includes the tips of the first protrusions 22. The plurality of second reference parts 24 are the second protrusions 25 provided to the second outer circumferential part 8. The second imaginary plane S2 includes the tips of the second protrusions 25. Therefore, it is easy to define the first imaginary plane S1 and the second imaginary plane S2.

Further, in the present example, the number of first reference parts 21 disposed is three, and the first reference parts 21 are separated at regular angular intervals around the design axis L. The number of second reference parts 24 disposed is three, and the second reference parts 24 are separated at regular angular intervals around the design axis L. Since the first reference parts 21 are disposed at the regular angular intervals, it is easy to suppress the measurement error when obtaining the coordinates of the first reference parts 21. Therefore, it is possible to accurately define the first imaginary plane S1. Similarly, since the second reference parts 24 are disposed at the regular angular intervals, it is easy to suppress the measurement error when obtaining the coordinates of the second reference parts 24. Therefore, it is possible to accurately define the second imaginary plane S2.

Further, each of the first protrusions 22 has a hemispherical shape. Therefore, when scanning the first outer circumferential part 7 of the first surface 5 with the probe P, it is possible to detect the tip of the first protrusion 22. Therefore, it is possible to accurately obtain the coordinate of each of the first protrusions 22. Further, each of the second protrusions 25 has a hemispherical shape. Therefore, when scanning the second outer circumferential part 8 of the second surface 6 with the probe P, it is possible to detect the tip of the second protrusion 25. Therefore, it is possible to accurately obtain the coordinate of each of the second protrusions 25. Thus, it is possible to accurately define the first imaginary plane S1 based on the coordinates of the first protrusions 22. Further, it is possible to accurately define the second imaginary plane S2 based on the coordinates of the second protrusions 25.

In the present example, the first surface 5 is provided with a convex shape. The second surface 6 is provided with a convex shape. Further, the first surface 5 is provided with the first inflection point 13 on the design axis L. The second surface 6 is provided with the second inflection point 14 on the design axis L. Therefore, when scanning the first surface 5 with the probe P, it is possible to detect the first inflection point 13. Further, when scanning the second surface 6 with the probe P, it is possible to detect the second inflection point 14. Therefore, it is possible to obtain the coordinate of the design axis L based on the coordinate of the first inflection point 13 and the coordinate of the second inflection point 14.

Here, in the present example, the first distance D1 from the design axis L to the tip of each of the first protrusions 22 is substantially constant. The second distance D2 from the design axis L to the tip of each of the second protrusions 25 is substantially constant. Further, the first distance D1 and the second distance D2 are substantially the same as each other. Therefore, it is easy to obtain the coordinate of the first central point 49 of the three first protrusions 22 on the first imaginary plane S1 from the coordinates of the tips of the first protrusions 22. Further, it is easy to obtain the coordinate of the second central point 52 of the three second protrusions 25 on the second imaginary plane S2 from the coordinates of the tips of the second protrusions 25. Therefore, it is easy to obtain the amount of eccentricity of the first surface 5 based on the coordinate of the first projection point 48 obtained by projecting the first inflection point 13 of the first surface 5 on the first imaginary plane S1 in the Z-axis direction and the coordinate of the first central point 49. Further, it is easy to obtain the amount of eccentricity of the second surface 6 based on the coordinate of the second projection point 51 obtained by projecting the second inflection point 14 of the second surface 6 on the second imaginary plane S2 in the Z-axis direction and the coordinate of the second central point 52.

Further, in the present example, as the reference surfaces 26, there are provided the first reference surface 27, and the second reference surface 28 perpendicular to the first reference surface 27. Therefore, by making the first reference surface 27 and the second reference surface 28 have contact with the jig-side first reference part 44a and the jig-side second reference part 45a provided to the measurement jig 41 so as to be perpendicular to each other, it is possible to achieve positioning the lens 1 in two axial directions perpendicular to the design axis L. Therefore, it is possible to accurately measure the surface shape of the surface to be examined. Here, it is possible to use only either one of the first reference surface 27 and the second reference surface 28 as the reference surface 26.

It should be noted that in the lens 1 described above, it is possible to provide four or more first reference parts 21. Similarly, it is possible to provide four or more second reference parts 24. Also in these cases, it is desirable to separate the first reference parts 21 at the regular angular intervals around the design axis L. Further, it is desirable to separate the second reference parts 24 at the regular angular intervals around the design axis L.

Modified Examples

Figure 10:
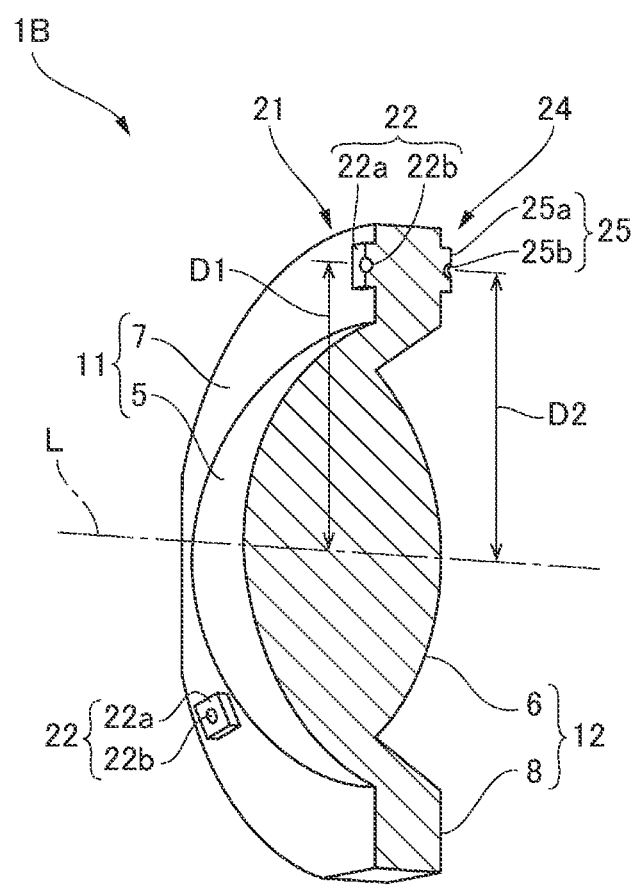
FIG. 10 is a partial cross-sectional view of a lens according to Modified Example 1.

FIG. 10 is a cross-sectional view of the first reference part 21 of a lens according to Modified Example 1. The lens 1B according to the present example is the same as the lens 1 described above in other constituents than the first reference parts 21 and the second reference parts 24. Therefore, the first reference parts 21 and the second reference parts 24 are hereinafter described, and the other description will be omitted.

The first reference parts 21 are each the first protrusion 22 provided to the first outer circumferential part 7. Each of the first protrusions 22 is provided with a first flat surface 22a disposed at the tip thereof. The first flat surface 22a is provided with a single first recessed part 22b having a shape on which a whole or a part of a hemispherical surface is transferred. In the present example, the first distance D1 from the design axis L to the center of each of the first recessed parts 22b is substantially constant. The second reference parts 24 are each the second protrusion 25 provided to the second outer circumferential part 8. Each of the second protrusions 25 is provided with a second flat surface 25a disposed at the tip thereof. The second flat surface 25a is provided with a single second recessed part 25b having a shape on which a whole or a part of a hemispherical surface is transferred. Similarly to the case shown in FIG. 3, the second distance D2 from the design axis L to the center of each of the second recessed parts 25b is substantially constant. Further, the first distance D1 and the second distance D2 are substantially the same as each other.

In the present example, the first imaginary plane S1 including the first reference parts 21 becomes to include the first flat surfaces 22a as the tips of the respective first protrusions 22. The second imaginary plane S2 including the second reference parts 24 becomes to include the second flat surfaces 25a as the tips of the respective second protrusions 25.

Here, the first recessed part 22b provided to the first flat surface 22a has a shape on which a whole or a part of a hemispherical shape is transferred. Therefore, when scanning the first outer circumferential part 7 of the first surface 5 with the probe P, it is possible to detect the center of the first recessed part 22b. Therefore, it is possible to accurately obtain the coordinate of each of the first protrusions 22. Further, the second recessed part 25b provided to the second flat surface 25a has a shape on which a whole or a part of a hemispherical shape is transferred. Therefore, when scanning the second outer circumferential part 8 of the second surface 6 with the probe P, it is possible to detect the center of the second recessed part 25b. Therefore, it is possible to accurately obtain the coordinate of each of the second protrusions 25.

Further, when the lens 1B is an injection-molded component made of resin, by forming protruding parts on an inner wall surface of the cavity 33 of the metal mold 30 for molding a lens, it is possible to provide the first recessed parts 22b and the second recessed parts 25b to the lens 1B. Here, the processing accuracy in providing the protruding parts to the inner wall surface of the cavity 33 is generally higher than the processing accuracy in providing the recessed parts to the inner wall surface of the cavity 33. Therefore, according to the present example, it is possible to accurately form the first recessed parts 22b and the second recessed parts 25b. Therefore, the accuracy of the coordinate of each of the first protrusions 22 and the accuracy of the coordinate of each of the protrusions 25 become higher. Therefore, it is possible to accurately obtain the first imaginary plane S1 and the second imaginary plane S2.

Figure 11:
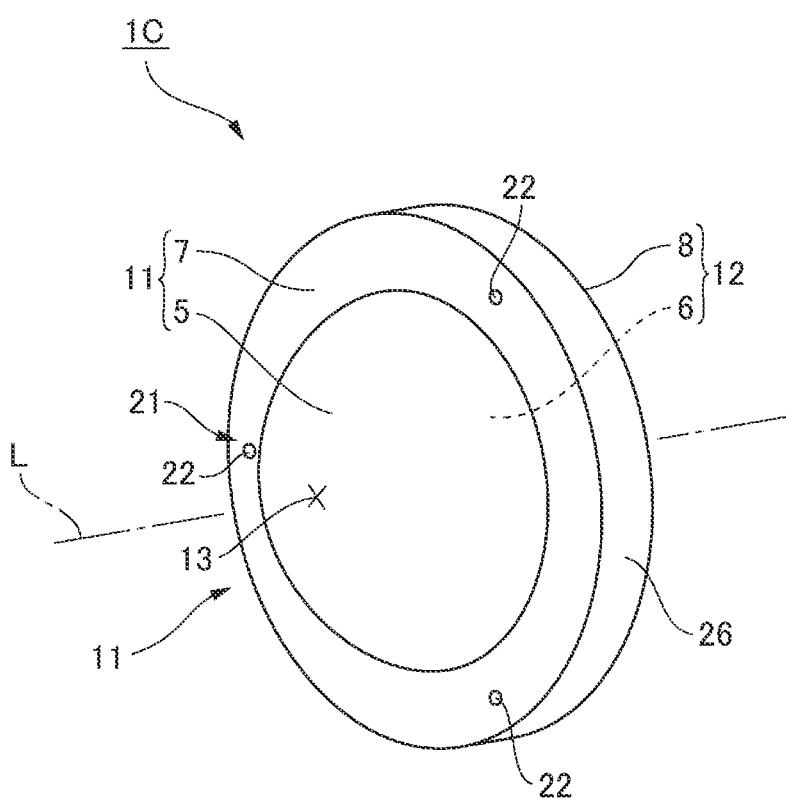
FIG. 11 is a perspective view of a lens according to Modified Example 2.

FIG. 11 is a perspective view of a lens according to Modified Example 2 when viewed from the obverse surface 11. The lens 1C according to the present example is different in shapes of the first surface 5, the second surface 6, and the reference surface 26 from the lens 1 described above, but is the same in other constituents as the lens 1 described above. Therefore, the constituents corresponding to those of the lens 1 described above will hereinafter be denoted by the same reference symbols. Further, the first surface 5, the second surface 6, and the reference surface 26 will be described, and the other description will be omitted.

In the present example, the first surface 5 and the second surface 6 are rotationally symmetric around the design axis L. The reference surface 26 disposed in parallel to the design axis L is a circular arc surface centering on the design axis L. The number of reference surfaces 26 is one. In the present example, the positioning of the lens 1C is achieved by making the reference surface 26 have contact with the jig-side reference part having a circular arc shape provided to the measurement jig 41.

Optical System

Here, as a lens constituting a projection optical system of a projector, it is possible to adopt the lens 1 according to the present example. Further, as a lens constituting an imaging optical system of an imaging device, it is possible to adopt the lens 1 according to the present example.

Projector

Figure 12:
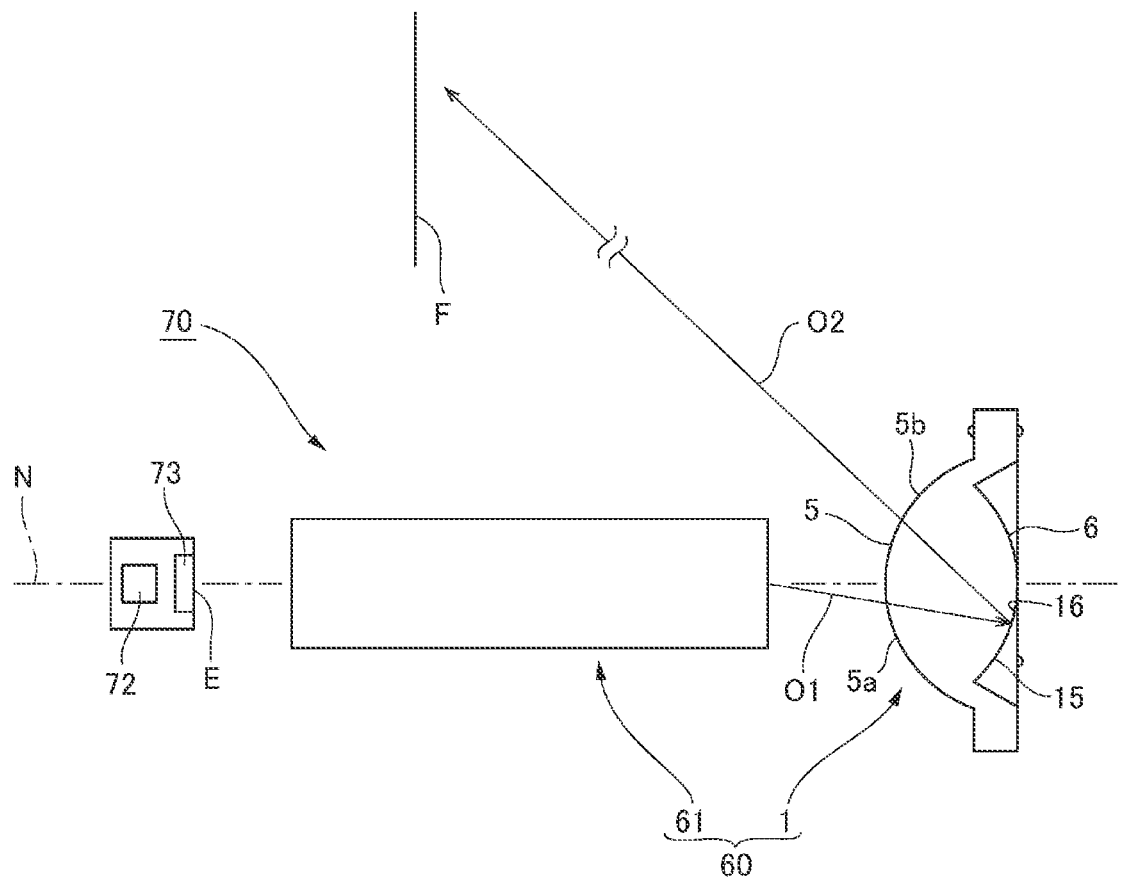
FIG. 12 is an explanatory diagram of a projector.

FIG. 12 is an explanatory diagram of the projector equipped with the projection optical system which adopts the lens 1 according to the present example. As shown in FIG. 12, an optical system 60 according to the present example is provided with a refracting optical system provided with a lens group 61 constituted by a plurality of lenses, and the lens 1 according to the present example disposed on the optical axis N of the lens group 61. In the lens 1, the light beam O1 from the lens group 61 enters the first area 5a at one side of the optical axis N in the first surface 5. The light beam having entered the lens 1 is folded back by the reflecting surface 16 toward a direction crossing the optical axis N. The light beam O2 having been folded back by the reflecting surface 16 is emitted from the second area 5b at the other side of the optical axis N in the first surface 5. Here, the optical system 60 is provided with a reduction-side imaging plane E at an opposite side to the lens 1 with respect to the lens group 61. It should be noted that the reduction-side imaging plane E in the projector 70 is disposed at substantially the center of the optical axis N, but this is not a limitation, and the reduction-side imaging plane E can be disposed at one side with respect to the optical axis N, or can be disposed at the other side with respect to the optical axis N. Further, the optical system 60 is provided with an enlargement-side imaging plane F conjugated with the reduction-side imaging plane E at the other side of the optical axis N and in front of the second area 5b.

The projector 70 is provided with an image formation section 71 for forming a projection image on the reduction-side imaging plane E of the optical system 60. The image formation section 71 is provided with a light source 72 and a light modulator 73 for modulating the light beam from the light source 72. The light modulator 73 is, for example, a liquid crystal light valve. The light modulator 73 modulates the light beam from the light source 72 based on an image signal for forming the projection image. The projection image formed on the reduction-side imaging plane E is projected on a screen disposed on the enlargement-side imaging plane F of the optical system 60. It should be noted that the optical system 60 can be made to be provided only with the lens 1.

Figure 13:
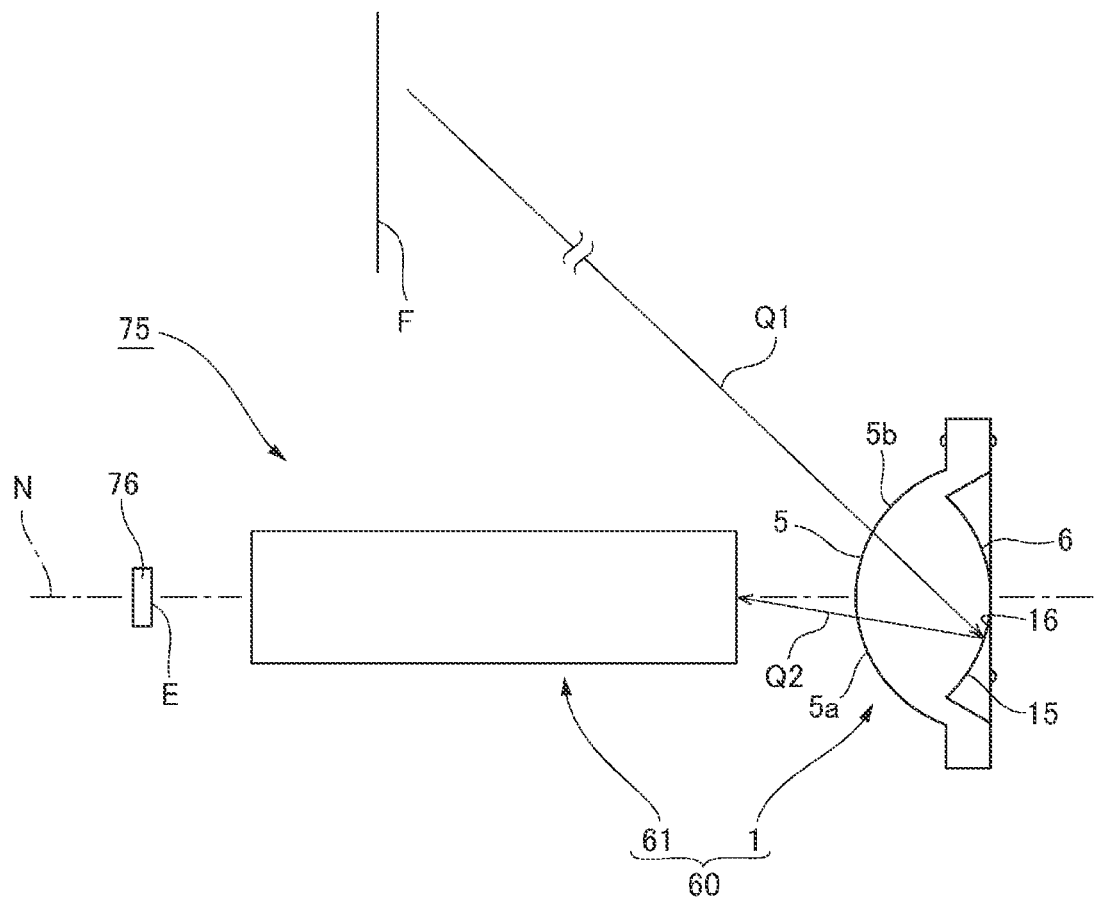
FIG. 13 is an explanatory diagram of an imaging device.

FIG. 13 is an explanatory diagram of the imaging device equipped with the imaging optical system which adopts the lens 1 according to the present example. The optical system 60 in the present example is the same as the optical system 60 used in the projector. Specifically, the optical system 60 is provided with a refracting optical system provided with the lens group 61 constituted by a plurality of lenses, and the lens 1 according to the present example disposed on the optical axis N of the lens group 61. In the imaging device 75, an imager 76 is disposed on the reduction-side imaging plane E of the optical device 60. It should be noted that the reduction-side imaging plane E in the imaging device 75 is not limited to being disposed at substantially the center of the optical axis N, but can also be disposed at one side with respect to the optical axis N, or can also be disposed at the other side with respect to the optical axis N similarly to the projector 70 shown in FIG. 12.

In the present example, the light beam Q1 from the enlargement-side imaging plane F enters the second area 5b at the other side of the optical axis N in the first surface 5 of the lens 1. The light beam having entered the lens 1 is folded back by the reflecting surface 16 located at the one side of the optical axis N. The light beam Q2 having been folded back by the reflecting surface 16 is emitted from the first area 5a at the other side of the optical axis N in the first surface 5, and then proceeds toward the lens group 61. The light beam having entered the lens group 61 is imaged on the imager 76 disposed on the reduction-side imaging plane E.

In the lens 1 according to the present example, no tilt occurs in the first surface 5 and the second surface 6. Therefore, it is possible to prevent or suppress the phenomenon that a distortion occurs in an image formed on the enlargement-side imaging plane F when projecting the projection image on the screen.

Further, in the lens 1 according to the present example, no tilt occurs in the first surface 5 and the second surface 6. Therefore, when adopting the optical system 60 provided with the lens 1 according to the present example in the imaging device 75, it is possible to prevent or suppress the phenomenon that a distortion occurs in the image on the imager 76.

What is claimed is:

1. A projector comprising:
a lens, the lens comprising:
a first surface;
a second surface opposed to the first surface;
a first outer circumferential part disposed at an outer circumferential side of the first surface;
a second outer circumferential part disposed at an outer circumferential side of the second surface;
a plurality of, three or more, first reference parts provided to the first outer circumferential part;
a plurality of, three or more, second reference parts provided to the second outer circumferential part; and
a first reference surface disposed at an outer circumferential side of the first outer circumferential part and the second outer circumferential part, wherein
the first surface and the second surface have a common design axis,
a first imaginary plane including the plurality of first reference parts and a second imaginary plane including the plurality of second reference parts are perpendicular to the design axis respectively, and
the first reference surface extends in parallel to the design axis; and
a light modulator configured to modulate light emitted from a light source, wherein the lens is configured to project the light modulated by the light modulator.

2. The lens according to claim 1, wherein
the first reference parts are each a first protrusion provided to the first outer circumferential part,
the first imaginary plane includes a tip of each of the first protrusions,
the second reference parts are each a second protrusion provided to the second outer circumferential part, and
the second imaginary plane is a plane including a tip of each of the second protrusions.

3. The lens according to claim 2, wherein
the first protrusions each have a hemispherical shape, and
the second protrusions each have a hemispherical shape.

4. The lens according to claim 2, wherein
a first distance from the design axis to the tip of each of the first protrusions and a second distance from the design axis to the tip of each of the second protrusions are substantially the same.

5. The lens according to claim 2, wherein
each of the first protrusions is provided with a first flat surface at the tip of the first protrusion,
the first flat surface is provided with a first recessed part having a shape on which a whole or a part of a hemispherical surface is transferred,
each of the second protrusions is provided with a second flat surface at the tip of the second protrusion, and
the second flat surface is provided with a second recessed part having a shape on which a whole or a part of a hemispherical surface is transferred.

6. The lens according to claim 5, wherein
a first distance from the design axis to a center of each of the first recessed parts and a second distance from the design axis to a center of each of the second recessed parts are substantially the same.

7. The lens according to claim 1, wherein
the number of first reference parts disposed is three, and the first reference parts are separated at regular angular intervals around the design axis, and
the number of second reference parts disposed is three, and the second reference parts are separated at regular angular intervals around the design axis.

8. The lens according to claim 1, further comprising:
a second reference surface perpendicular to the first reference surface.

9. The lens according to claim 1, wherein
the first surface and the second surface are rotationally symmetric around the design axis, and the first reference surface is a circular arc surface centering on the design axis.

10. The lens according to claim 1, wherein
the first surface is provided with a convex shape,
the second surface is provided with a convex shape,
the first surface is provided with a first inflection point on the design axis, and
the second surface is provided with a second inflection point on the design axis.

11. The lens according to claim 1, wherein
at least one of the first surface and the second surface is an aspheric surface.

12. The lens according to claim 1, wherein
the second surface is provided with a reflective coating layer, and
the reflective coating layer is a reflecting surface having a concave shape on which a surface shape of the second surface is transferred.

13. An optical system comprising:
the lens according to claim 12, wherein
a light beam passing through the lens proceeds via a first area as a part of the first surface, the reflecting surface, and a second area different from the first area in the first surface in this order.

14. A projector comprising:
a light modulator configured to modulate light emitted from a light source; and
the optical system according to claim 13 configured to project the light modulated by the light modulator.

15. An imaging device comprising:
the lens according to claim 1; and
an imager disposed on a reduction-side imaging plane on which light emitted from the lens is imaged.

16. An imaging device comprising:
the optical system according to claim 13; and
an imager disposed on a reduction-side imaging plane on which light emitted from the optical system is imaged.

17. An imaging device comprising:
a lens, the lens comprising
a first surface;
a second surface opposed to the first surface;
a first outer circumferential part disposed at an outer circumferential side of the first surface;
a second outer circumferential part disposed at an outer circumferential side of the second surface;
a plurality of, three or more, first reference parts provided to the first outer circumferential part;
a plurality of, three or more, second reference parts provided to the second outer circumferential part; and
a first reference surface disposed at an outer circumferential side of the first outer circumferential part and the second outer circumferential part, wherein
the first surface and the second surface have a common design axis,
a first imaginary plane including the plurality of first reference parts and a second imaginary plane including the plurality of second reference parts are perpendicular to the design axis respectively, and
the first reference surface extends in parallel to the design axis; and
an imager disposed on a reduction-side imaging plane on which light emitted from the lens is imaged.

* * * * *